US012602539B2

(12) United States Patent
Carbune et al.

(10) Patent No.: US 12,602,539 B2
(45) Date of Patent: Apr. 14, 2026

(54) PROACTIVE ASSISTANCE VIA A CASCADE OF LLMS

(71) Applicant: Google LLC, Mountain View, CA (US)

(72) Inventors: Victor Carbune, Zürich (CH);
Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 188 days.

(21) Appl. No.: 18/390,675

(22) Filed: Dec. 20, 2023

(65) Prior Publication Data

US 2025/0209261 A1    Jun. 26, 2025

(51) Int. Cl.
*G06F 40/20*        (2020.01)

(52) U.S. Cl.
CPC .................................... *G06F 40/20* (2020.01)

(58) Field of Classification Search
CPC ....................................................... G06F 40/20
See application file for complete search history.

(56) References Cited

U.S. PATENT DOCUMENTS

| | | | | |
|---|---|---|---|---|
| 11,195,534 B1* | 12/2021 | Shen | .......................... | G10L 17/00 |
| 2023/0037085 A1 | 2/2023 | Biadsy et al. | | |
| 2024/0126794 A1* | 4/2024 | Cook | ...................... | H04L 51/02 |
| 2024/0362468 A1* | 10/2024 | Lee | ........................ | G06N 3/047 |
| 2025/0077237 A1* | 3/2025 | Sachindran | .............. | G06N 3/08 |
| 2025/0150474 A1* | 5/2025 | Jones | ....................... | G06N 3/08 |
| 2025/0165752 A1* | 5/2025 | Lovric | ................... | G06N 20/00 |
| 2025/0190872 A1* | 6/2025 | Kissane | ................ | G06N 20/00 |

OTHER PUBLICATIONS

Yun Zhu et al: "Towards an On-device Agent for Text Rewriting", arxiv.org, Cornell University Library, 201 Olin Library Cornell University Ithaca, NY 14853, Aug. 22, 2023 (Aug. 22, 2023), XP091598325.
International Search Report and Written Opinion issued in related PCT Application No. PCT/US2024/053134, dated Jan. 29, 2025.

* cited by examiner

*Primary Examiner* — Sonia L Gay
(74) *Attorney, Agent, or Firm* — Honigman LLP; Brett A. Krueger; Grant Griffith

(57) ABSTRACT

A method for providing proactive assistance includes obtaining, by a digital assistant, a contextual event associated with a user of a user device. The method includes determining, using a local large language model (LLM) executing on the user device, a remote LLM prompt confidence. The method includes determining that the remote LLM prompt confidence satisfies a threshold. Based on determining that the remote LLM prompt confidence satisfies the threshold, the method includes generating a remote LLM prompt for a remote LLM executing remote from the user device. The method includes transmitting, to the remote LLM, the remote LLM prompt. The method includes receiving, at the digital assistant, from the remote LLM, response content providing the proactive assistance associated with the contextual event. The method includes providing, for output from the user device, presentation content based on the response content received from the remote LLM.

20 Claims, 5 Drawing Sheets

110

PROACTIVE ASSISTANCE VIA A CASCADE OF LLMS

TECHNICAL FIELD

This disclosure relates to proactive assistance via a cascade of large language models (LLMs).

BACKGROUND

Large language models (LLMs) are increasingly used to provide conversational experiences between users and digital assistant interfaces executing on user devices. In general, a user provides a query/prompt to the LLM in natural language that requests information and the LLM generates, based on the query/prompt, a response conveying the requested information. However, digital assistants are often relied upon to offer proactive features to users in order to possibly provide assistance to the user before the user realizes assistance is needed. These proactive systems require efficient infrastructure to continually monitor and react to events.

SUMMARY

One aspect of the disclosure provides a method for providing proactive assistance via a cascade of large language models (LLMs). The computer-implemented method, when executed by data processing hardware, causes the data processing hardware to perform operations. The operations include obtaining, by a digital assistant, a contextual event associated with a user of a user device. The operations also include determining, using an LLM executing on the user device, a remote LLM prompt confidence indicating a likelihood of prompting a remote LLM for proactive assistance associated with the contextual event. The operations include determining that the remote LLM prompt confidence satisfies a threshold. The operations also include, based on determining that the remote LLM prompt confidence satisfies the threshold, generating a remote LLM prompt for a remote LLM executing remote from the user device. The operations include transmitting, to the remote LLM, the remote LLM prompt and receiving, at the digital assistant, from the remote LLM, response content providing the proactive assistance associated with the contextual event. The operations also include providing, for output from the user device, presentation content based on the response content received from the remote LLM.

Implementations of the disclosure may include one or more of the following optional features. In some implementations, the remote LLM prompt confidence includes a probability generated by the local LLM. Optionally, the operations further include generating, using the local LLM, initial response content providing initial proactive assistance associated with the contextual event; providing, for output from the user device, initial presentation content based on the initial response content; and receiving initial presentation content interaction indicating user interaction with the initial presentation content. In at least some of these examples, the remote LLM prompt confidence includes the initial presentation content interaction. The initial presentation content interaction may include user consent for transmitting the remote LLM prompt to the remote LLM.

In some examples, the remote LLM prompt is based on output from the local LLM. In some of these examples, the output includes a summary of the contextual event. Alternatively or additionally, the contextual event may include personal identification information associated with the user and generating the remote LLM prompt includes redacting, using the output from the local LLM, the personal identification information.

In some implementations, the contextual event includes at least one of sensor data captured by a sensor of the user device or application-specific data generated by another application executing on the user device. The contextual event may include non-textual data and the operations may further include transforming the non-textual data into textual data. In some implementations, the operations further include batching a plurality of contextual events together and determining the remote LLM prompt confidence is further based on the batched plurality of contextual events.

Another aspect of the disclosure provides a system for providing proactive assistance via a cascade of LLMs. The system includes data processing hardware and memory hardware in communication with the data processing hardware. The memory hardware stores instructions that when executed on the data processing hardware cause the data processing hardware to perform operations. The operations include obtaining, by a digital assistant, a contextual event associated with a user of a user device. The operations also include determining, using an LLM executing on the user device, a remote LLM prompt confidence indicating a likelihood of prompting a remote LLM for proactive assistance associated with the contextual event. The operations include determining that the remote LLM prompt confidence satisfies a threshold. The operations also include, based on determining that the remote LLM prompt confidence satisfies the threshold, generating a remote LLM prompt for a remote LLM executing remote from the user device. The operations include transmitting, to the remote LLM, the remote LLM prompt and receiving, at the digital assistant, from the remote LLM, response content providing the proactive assistance associated with the contextual event. The operations also include providing, for output from the user device, presentation content based on the response content received from the remote LLM This aspect may include one or more of the following optional features. In some implementations, the remote LLM prompt confidence includes a probability generated by the local LLM. Optionally, the operations further include generating, using the local LLM, initial response content providing initial proactive assistance associated with the contextual event; providing, for output from the user device, initial presentation content based on the initial response content; and receiving initial presentation content interaction indicating user interaction with the initial presentation content. In at least some of these examples, the remote LLM prompt confidence includes the initial presentation content interaction. The initial presentation content interaction may include user consent for transmitting the remote LLM prompt to the remote LLM.

In some examples, the remote LLM prompt is based on output from the local LLM. In some of these examples, the output includes a summary of the contextual event. Alternatively or additionally, the contextual event may include personal identification information associated with the user and generating the remote LLM prompt includes redacting, using the output from the local LLM, the personal identification information.

In some implementations, the contextual event includes at least one of sensor data captured by a sensor of the user device or application-specific data generated by another application executing on the user device. The contextual event may include non-textual data and the operations may further include transforming the non-textual data into textual data. In some implementations, the operations further include batching a plurality of contextual events together and determining the remote LLM prompt confidence is further based on the batched plurality of contextual events.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
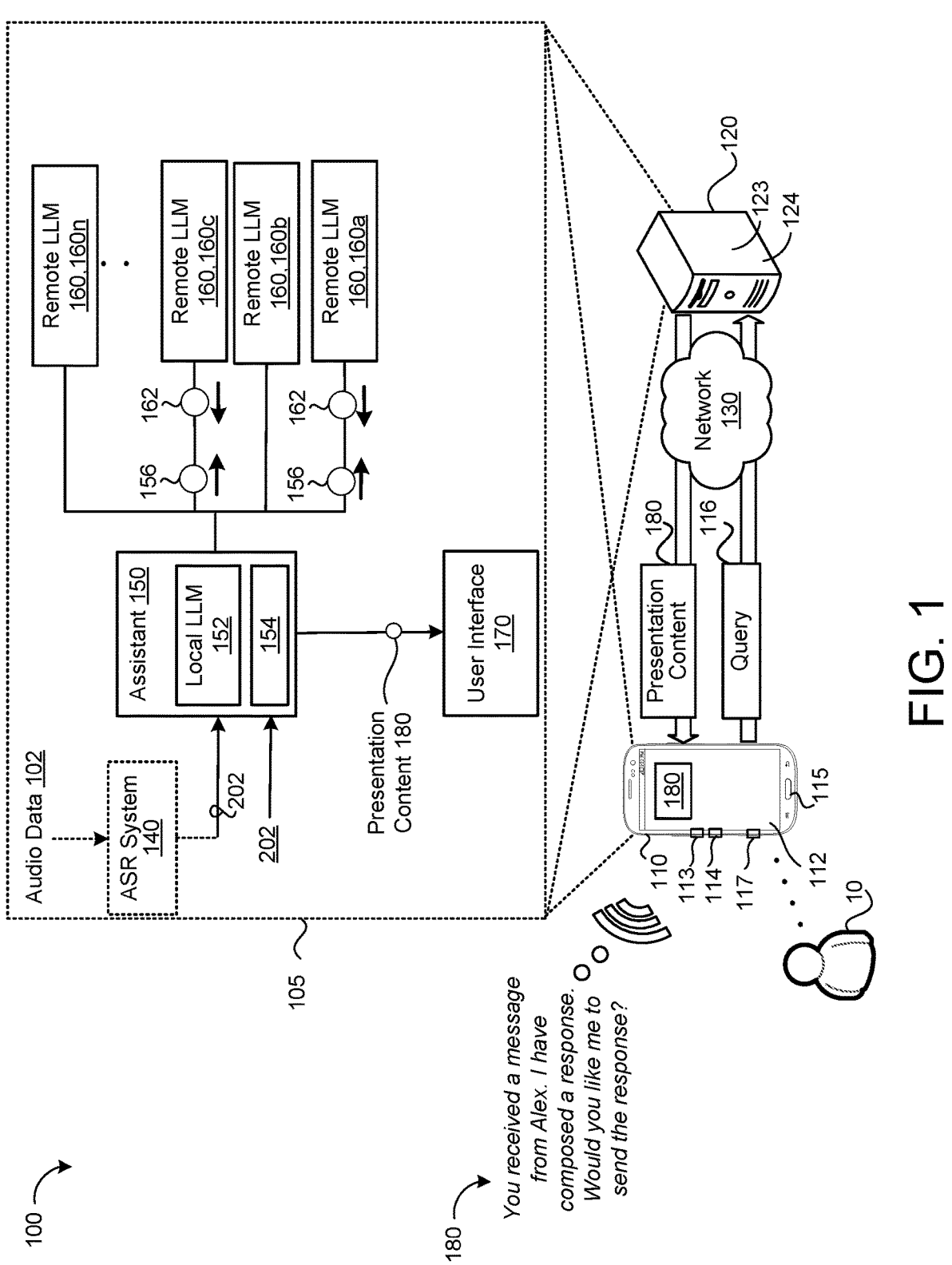
FIG. 1 is a schematic view of an example system for providing proactive assistance to a user.

Digital assistants increasingly offer proactive features to users in order to assist the user before the user may realize that assistance is needed. For example, proactive assistance includes performing an action based on an incoming message (possibly before the user has even read the message), offering travel directions based on an incoming calendar event (e.g., such as a flight), sending updates based on current location, etc. At its core, proactive assistance relies on the digital assistant being able to detect contextual state changes that are relevant to the user and intervene in a way and at a time that is appreciated by the user. Therefore, such proactive systems require efficient infrastructure to constantly monitor and react to events.

Large language models (LLMs) are increasingly used to provide conversational experiences between users and digital assistant interfaces executing on user devices. In general, a user provides a query/prompt to the LLM in natural language that requests information and the LLM generates, based on the query/prompt, a response conveying the requested information. While the rise of LLMs is a key technology enabler for more complex proactive assistant features, such enablement comes with prohibitive inference and privacy cost with conventional architecture.

More specifically, proactive features can bring significant benefits to users, particularly when coupled with the reasoning abilities of LLMs. In general, the richer the interpretations of contextual events (e.g. incoming messages), the more utility an assistant can bring to users. For example, a digital assistant may monitor incoming messages at a user device and interpret the messages on the user's behalf, such as by predicting the user's response with the incoming information and performing an action based on the predicted response. As a more specific example, a user may have multiple different conversational threads simultaneously through a messaging application. A first thread may require immediate input from the user to reach an agreement, a second thread may involve a discussion that requires no timeline for a response, while a third thread may require user input later in the day prior to occurrence of a meeting. The digital assistant may monitor each conversational thread and predict actions based on the context of the respective thread. Conventional infrastructure requires each thread to be provided to a LLM running in the cloud to extract information from the growing context.

As another example, a user may execute multiple apps in parallel on a user device that each consumes sensor data and/or app information from the user device. These apps (or the operating system) may frequently emit events (e.g., location changes, event notifications, site notifications, etc.). Through these events, LLMs may provide interpretation useful to the user. For instance, based on these events, an LLM may provide responses to the user that include "You appear to be traveling, but you do not have an active ticket" or "I will let Alex know you started driving." Conventional infrastructure requires continuous streaming of these events (e.g., a state of the user device) to a server-side LLM that processes the events and determines whether an action is required or not. The LLM may even generate an action that requires more context to be delivered from the user device, only then to decide a proactive feature should not be activated.

Thus, while large language models can naturally process incoming events at an unprecedented level of understanding, associated inference costs make the system prohibitively expensive, and may result in a loss of privacy when run in the cloud. Implementations herein are directed toward systems and methods that lower inference costs while leveraging the benefits of LLMs for proactive features and simultaneously providing stronger privacy guarantees. In some implementations, inference for the LLMs is split between a smaller on-device LLM and a larger server-side LLM. The smaller on-device LLM may predict or determine, based on context received from the device, when to trigger or call the server-side LLM, thus reducing the costs of interacting with the server-side LLM. Additionally or alternatively, the on-device LLM may redact or otherwise limit the amount of personal identifiable information (PII) that is provided to the server-side LLM, thereby increasing privacy.

FIG. 1 illustrates an example system 100 including an LLM proactive assistance system 105 for allowing a digital assistant 150 to interact with one or more remote LLMs 160 to perform actions on behalf of a user 10 associated with the digital assistant 150. Generally, the digital assistant 150 receives, via the user device 110, one or more contextual events 202 associated with the user 10 of the user device 110. Each contextual event 202 includes raw signal data (e.g., from an accelerometer, GPS sensor, etc.) or application-specific interpretation of data (e.g., message text from a messaging app, a notification from travel application, etc.). The digital assistant 150 may receive contextual events 202 as a stream of events.

The user device 110 and/or the digital assistant 150 include a local LLM 152 that executes on the user device 110. The digital assistant 150 and local LLM 152 process the one or more contextual events 202 to provide proactive assistance associated with the contextual event(s) 202 for the user 10. The contextual events 202 may be provided to the local LLM 152 in raw form or, alternatively, converted from a non-textual form into a textual form. The digital assistant 150 and/or the local LLM 152 may communicate with one or more remote LLMs 160, 160a-n to help determine and/or fulfill performance of the proactive assistance. Here, the digital assistant 150 and/or local LLM 152 process the contextual events 202 to determine a remote LLM prompt confidence 154. The remote LLM prompt confidence 154 determines when the digital assistant 150 communicates with the remote LLM 160 to complete the assistance. For example, when the remote LLM prompt confidence 154 satisfies a threshold, the digital assistant 150 transmits a prompt, based on the contextual event 202, to the remote LLM 160. The digital assistant 150 may always communicate with the same remote LLM 160. Alternatively, the digital assistant 150 may select a remote LLM 160 from a plurality of remote LLMs 160 to prompt based on, for example, the contextual events 202 or other factors. For example, the digital assistant 150 selects a remote LLM 160 that is associated with a particular business entity based on context from the contextual events 202. Optionally, and based on the output from the local LLM, the remote LLM 160 and/or the digital assistant determines whether any proactive assistance is warranted, and, if so, performs one or more tasks to fulfill the determined proactive assistance.

Fulfillment of the proactive assistance may require performance of multiple portions, or sub-actions/tasks, that collectively define the proactive assistance. As such, the digital assistant 150 may communicate with multiple remote LLMs 160 to fulfill performance of the assistance. Additionally or alternatively, one or more remote LLMs 160 may communicate with other remote LLMs 160 to fulfill performance of the assistance. For each corresponding remote LLM 160 communicated with by the digital assistant interface, the digital assistant 150 may issue, for input to the corresponding remote LLM 160, a respective prompt 156 specifically formulated for the corresponding remote LLM 160 to fulfill performance of the assistance. The digital assistant 150 may receive, from the corresponding remote LLM 160, corresponding response content 162 that conveys details regarding performance of the corresponding portion of the action fulfilled by the corresponding remote LLM 160. The digital assistant 150 may facilitate, with or without involving input from the user 10, multiple interactions with the corresponding remote LLM 160 until the corresponding portion of the action is fulfilled. In some examples, a remote LLM 160 will automatically query another remote LLM 160 to fulfill one or more actions. Based on the corresponding response content 162 received from each corresponding remote LLM 160, the digital assistant 150 is configured to provide, for output from the user device 110, presentation content 180. The user device 110 may audibly output, from an audio output device (e.g., acoustic speaker) 117, the presentation content 180 as synthesized speech. Additionally or alternatively, the user device 110 may display, on a screen 112 in communication with the user device 110, graphics, text, and/or other visual information that conveys the details of the presentation content 180.

The system 100 includes the user device 110, a remote computing system 120, and a network 130. The user device 110 includes data processing hardware 113 and memory hardware 114. The user device 110 may include, or be in communication with, an audio capture device 115 (e.g., an array of one or more microphones) for converting utterances of natural language queries spoken by the user 10 into corresponding audio data 102 (e.g., electrical signals or digital data). In lieu of spoken input, the user 10 may input a textual representation of the natural language query via a user interface 170 executing on the user device 110. In scenarios when the user speaks a natural language query captured by the microphone 115 of the user device 110, an automated speech recognition (ASR) system 140 executing on the user device 110 or the remote computing system 120 may process the corresponding audio data 102 to generate a transcription of the query. The transcription may convey the natural language query as a textual representation for input to the digital assistant 150. The ASR system 140 may implement any number and/or type(s) of past, current, or future speech recognition systems, models and/or methods including, but not limited to, an end-to-end speech recognition model, such as streaming speech recognition models having recurrent neural network-transducer (RNN-T) model architectures, a hidden Markov model, an acoustic model, a pronunciation model, a language model, and/or a naïve Bayes classifier.

The user device 110 may be any computing device capable of communicating with the remote computing system 120 through the network 130. The user device 110 includes, but is not limited to, desktop computing devices and mobile computing devices, such as laptops, tablets, smart phones, smart speakers/displays, digital assistant devices, smart appliances, internet-of-things (IoT) devices, infotainment systems, vehicle infotainment systems, and wearable computing devices (e.g., headsets/earbuds, smart glasses, and/or watches).

The remote computing system 120 may be a distributed system (e.g., a cloud computing environment) having scalable elastic resources. The resources include computing resources 123 (e.g., data processing hardware) and/or storage resources 124 (e.g., memory hardware). Additionally or alternatively, the remote computing system 120 may be a centralized system. The network 130 may be wired, wireless, or a combination thereof, and may include private networks and/or public networks, such as the Internet.

With continued reference to FIG. 1, the LLM proactive assistance system 105 includes the ASR system 140, the local LLM 152, the one or more remote LLMs 160, and the user interface 170. The ASR system 140 may be optional or only leveraged when the user 10 prefers spoken input of natural language queries as opposed to typed input. In some implementations, the LLM proactive assistance system 105 executes on both the data processing hardware 113 of the user device 110 and the data processing hardware 123 of the remote computing system 120. For instance, one or more components of the LLM proactive assistance system 105 execute on the data processing hardware 113 of the user device 110 while one or more other components of the LLM proactive assistance system 105 execute on the remote computing system 120. While not shown, the remote LLMs 160 may execute on different remote computing systems depending on service providers operating the remote LLMs 160. As such, the digital assistant 150 may interact with different remote LLMs 160 of the LLM proactive assistance system 105 that execute across a diverse set of remote computing systems operated by different providers.

In some implementations, the local LLM 152 is a reduced version of the remote LLM 160 (e.g., the local LLM 152 has approximately one billion parameters while the remote LLM 160 has approximately 540 billion parameters). In these implementations, the local LLM 152 and the remote LLM 160 are trained on similar datasets and the prompting for the local LLM 152 and the remote LLM 160 may be similar. That is, the prompt provided to the local LLM 152 (e.g., by the digital assistant 150) may be the same or similar to the prompt 156 provided to the remote LLM 160 (i.e., the prompting is consistent). In some of these implementations, the digital assistant 150 may opt to prompt the remote LLM 160 when the local LLM 152 has a confidence in its prediction that is below a threshold confidence. That is, in these implementations, the remote LLM prompt confidence 154 includes a probability or confidence generated by the local LLM 152. When the probability generated by the local LLM 152 satisfies the threshold (e.g., is below a predetermined value), the digital assistant 150 determines that the larger remote LLM 160 is necessary to generate an adequate response to the prompt.

In other implementations, the local LLM 152 is fine-tuned specifically for generating the prompts 156 specifically formulated for the remote LLM 160. For example, the local LLM 152 is fine-tuned to summarize or simplify the prompt 156 for the remote LLM 160, while the remote LLM 160 is responsible for generation of the response content 162 that provides the proactive assistance. The summarized or simplified prompts 156 may be shorter (e.g., include less tokens) than the raw contextual events 202 (thus saving bandwidth and inference costs) and may also be configured to produce more accurate or relevant answers from the remote LLM 160. In some configurations, prompt engineering techniques are used to provide prompts that instruct the local LLM on how to summarize or simplify the prompt. Additionally or alternatively, a soft-prompt embedding may be specifically trained and issued to the local LLM 152 to cause the local LLM 152 to summarize or simplify the prompt 156 for the remote LLM 160.

Figure 2:
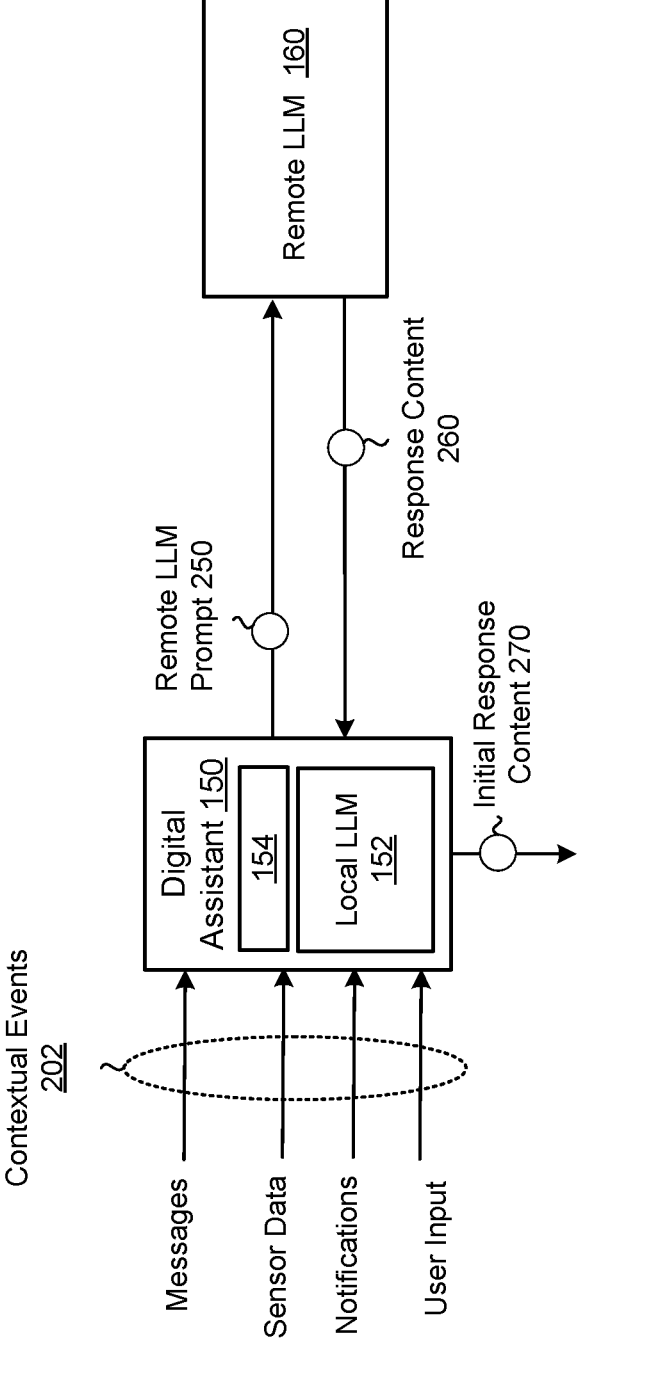
FIG. 2 is a schematic view of contextual events for a cascade of large language models (LLMs).

Referring now to FIG. 2, a schematic view 200 includes the digital assistant 150 receiving exemplary contextual events 202. In some examples, the digital assistant 150 batches a plurality of contextual events 202 together and the digital assistant 150 and/or the local LLM 152 determine the remote LLM prompt confidence 154 based on the batched contextual events 202. That is, the digital assistant 150 may include a continuous triggering system that monitors for contextual events 202 and leverages the local LLM 152 to determine when to offer proactive assistance. For example, the digital assistant 150 batches together multiple contextual events 202/signals locally instead of uploading each contextual event 202 to the remote LLM 160. The digital assistant 150 may group or batch the contextual events 202 together for further processing to determine if and when the remote LLM 160 should be contacted. The digital assistant 150 may batch the contextual events 202 using the same logic to be conventionally used server-side (i.e., at the remote LLM 160). Alternatively, the digital assistant 150 may batch the contextual events 202 using specific batching mechanisms based on the remote LLM 160 or based on the type of proactive features enabled.

The local LLM 152 may receive the grouped incoming context of one or more contextual events 202 (e.g., via a windowed approach, streaming input, and/or individual contextual events 202). The local LLM 152 determines whether the context is relevant for the remote LLM 160 and/or transforms the context to simplify processing by the remote system 140/remote LLM 160 and/or show an initial proactive result to a user 10. In some implementations, the digital assistant 150 generates, using the local LLM 152, initial response content 270 that provides initial proactive assistance associated with the contextual event 202. The digital assistant 150 may provide, for output from the user device 110, initial presentation content 310 (FIG. 3) based on the initial response content 270 and receive initial presentation content interaction 320 indicating user interaction with the initial presentation content 310. In some of these examples, the remote LLM prompt confidence 154 includes the initial presentation content interaction 320.

Figure 3:
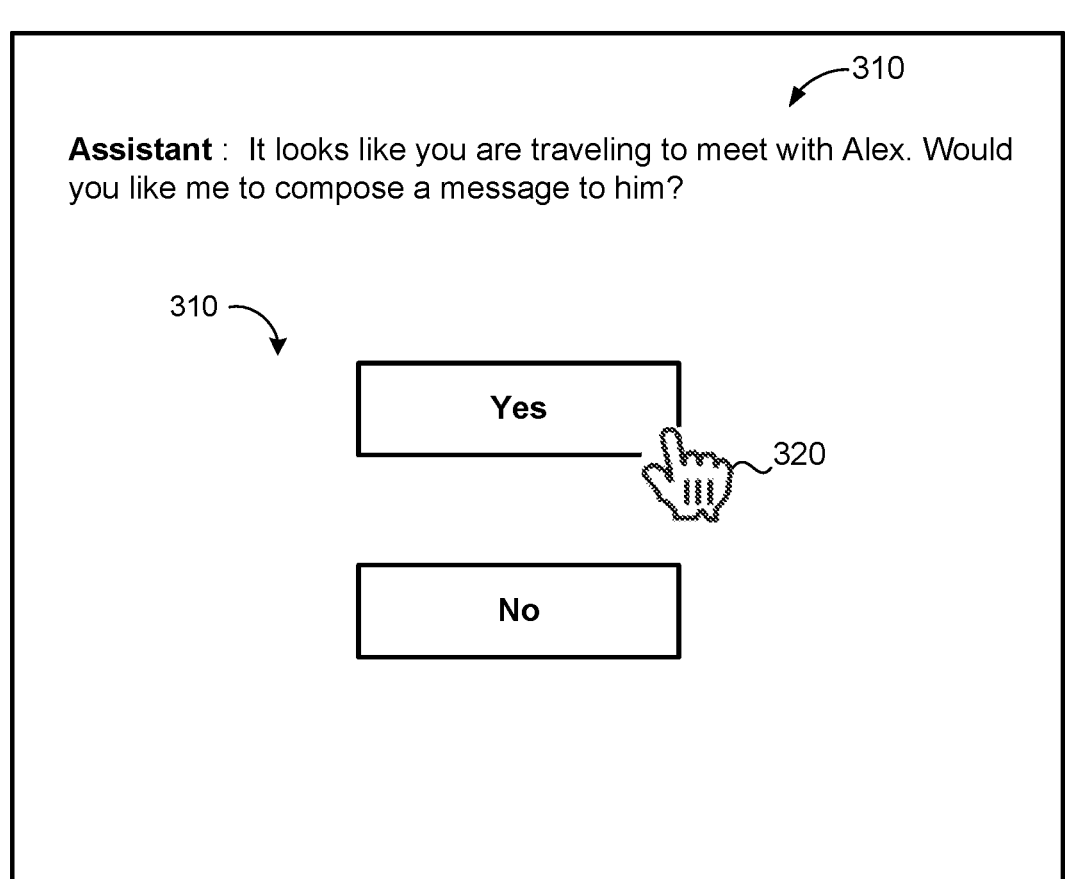
FIG. 3 is a schematic view of an example screen displaying initial presentation content.

For example, and as illustrated in FIG. 3, the digital assistant 150 presents, for output from the user device 110, initial presentation content 310 associated with the one or more contextual events 202. In this example, the initial presentation content 310 includes a textual message reciting "It looks like you are traveling to meet with Alex. Would you like me to compose a message to him?" While this example depicts the initial presentation content 310 output for display on the screen 112 of the user device, the initial presentation content 310 may additionally or alternatively be audibly output from the user device 110 as synthesized speech reciting the textual message. Such initial presentation content 310 may be in response to the digital assistant 150 receiving one or more contextual events 202 that indicate that the user 10 of the user device 110 is traveling (e.g., determined via sensor data received from a GPS sensor) and has an upcoming meeting with Alex (e.g., determined via a notification from a calendar application). The user 10 may provide the digital assistant 150 with the initial presentation content interaction 320 via interacting with the initial presentation content 310 (e.g., by selecting a button, speaking one or more words, making a gesture on the screen such as a swipe, etc.). Here, the user 10 provides the initial presentation content interaction 320 via selection of a user-selectable button labeled "Yes".

The initial presentation content 310 may provide insight for the digital assistant 150 whether further assistance is required. For example, the digital assistant 150 determines, based on the initial presentation content interaction 320 (or lack thereof), that the user 10 does not require any further assistance. In this example, the digital assistant 150 can decline from communicating a prompt 156 to the remote LLM 160 (thus decreasing costs). In other examples, the digital assistant 150 determines, based on the initial presentation content interaction 320 (or lack thereof), that further assistance is warranted. In these examples, the digital assistant 150 and/or the local LLM 152 generate a prompt 156 for the remote LLM 160. In the illustrated example of FIG. 3, the local LLM 152 may generate a prompt 156 for the remote LLM 160 that includes a request to compose a message to Alex along with any relevant information from the contextual events 202 (e.g., the user's current location, estimated arrival time, arrival destination, etc.).

In some implementations, the initial presentation content interaction 320 includes user consent for transmitting the prompt 156 to the remote LLM 160 to allow the user 10 to exercise greater control over privacy. That is, optionally, the initial presentation content 310 allows the user 10 the opportunity to consent to transmitting the prompt 156, which may include personal or sensitive information, to the remote LLM 160. In the example of FIG. 3, the user 10 selecting the "Yes" button serves as consent to communicate with the remote LLM 160. The consent may be based on previous interactions with the digital assistant 150 (e.g., a prompt indicating to the user 10 that agreeing to further assistance serves as temporary consent to communicate with the remote LLM 160).

On some occasions, the contextual event 202 and/or the required proactive assistance include personal identification information (PII) or information otherwise sensitive in nature. In these instances, the digital assistant 150 and/or the local LLM 152 may redact or otherwise censor the sensitive information from the remote LLM 160. For example, the digital assistant 150 prompts the local LLM 152 to generate the prompt 156 for the remote LLM 160 that omits any private and/or sensitive information. For example, the digital assistant 150 may use prompt examples (e.g., few-shot examples for training the remote LLM 160 to perform a specific task), fine-tuning, or any other technique to anonymize the prompt 156. Additionally or alternatively, the digital assistant 150 only contacts the remote LLM 160 when the user consents, as discussed above. In these examples, private or sensitive information may be shared with the remote LLM 160 to enhance generation of the proactive assistance. When redacting private/sensitive information such as a contact name, the local LLM 152 may generate the prompt 156 by including placeholder tokens (e.g., #NAME) replacing the contact name such that the remote LLM 160 is only able to ascertain the placeholder token. As such, response content 162 generated by the remote LLM 160 requiring recitation of the contact name instead includes the placeholder token (e.g., #NAME) used by the local LLM 152 in the prompt 156, whereby the local LLM 152 (or the digital assistant 150) modifies the response content 162 by replacing instances of the placeholder token with the contact name.

Referring back to FIG. 1, in some implementations, the local LLM 152 processes the contextual events 202 to provide intermediate interpretations that are transmitted to the remote LLM 160 for partial processing by the remote LLM 160 as opposed to full processing by the remote LLM 160 to reduce costs. For example, the local LLM 152 processes messages from one or more messaging applications and extracts or generates a summary of the messages along with a score or suggestion as to what kind of assistance would be useful to perform or suggest based on the messages. In some implementations, the local LLM 152 generates a confidence for one or more portions of the interpretations. In some of these implementations, the digital assistant 150 and/or local LLM 152 generates the prompt 156 for the remote LLM 160 that, when the confidence is lower than a threshold value for a respective portion of the interpretations, requests the remote LLM 160 provide a more accurate interpretation of the respective portion. When the digital assistant 150 receives the interpretation of the respective portion from the remote LLM 160 (i.e., via response content 162), the digital assistant 150 and/or the local LLM 152 may determine whether the remote LLM 160 should be provided the entire interpretation. Alternatively, the digital assistant, based on the interpretation of the respective portion from the remote LLM 160, may wait for further contextual events 202, cancel the proactive assistance, or generate the proactive assistance locally (i.e., using the local LLM 152).

The digital assistant 150 may determine to call or communicate with the remote LLM 160 based on a number of different circumstances. In some examples, the digital assistant 150 automatically generates the prompt 156 using the local LLM 152. The response content 162 from the remote LLM 160 is then used to determine what, if any, proactive assistance to provide. In other examples, the digital assistant 150 displays a proactive notification for the user 10 using the user device 110 and only calls the remote LLM 160 when the user appropriately reacts with the proactive notification (e.g., via touch or voice). In yet other examples, the digital assistant 150 generates a partial proactive suggestion using the local LLM 152. The partial proactive suggestion may be expanded when the user 10 interacts with the suggestion. For example, the partial proactive suggestion includes the message "Your input is needed for this message." When the user interacts with the proactive suggestion, the digital assistant 150 may, using the local LLM 152, generate a prompt 156 for the remote LLM 160 to generate a full summary and one or more candidate responses for the message.

The digital assistant 150 may, over time, gather signals to determine an effectiveness of the LLM cascade for the user 10. The signals include, for example, when proactive features are triggered, when the proactive features are deemed useful by the user 10, when the proactive features are ignored by the user 10, when the remote LLM 160 requests additional context, etc. For example, the system may indicate whether the user 10 interacted with or used the proactive feature (such as engaging with a generated notification, performing the suggested action like sending a message, etc.). A log of utility events may refine the cascade system and, in some implementations, introduce additional local LLMs 152 that are specialized for reward feedback.

Figure 4:
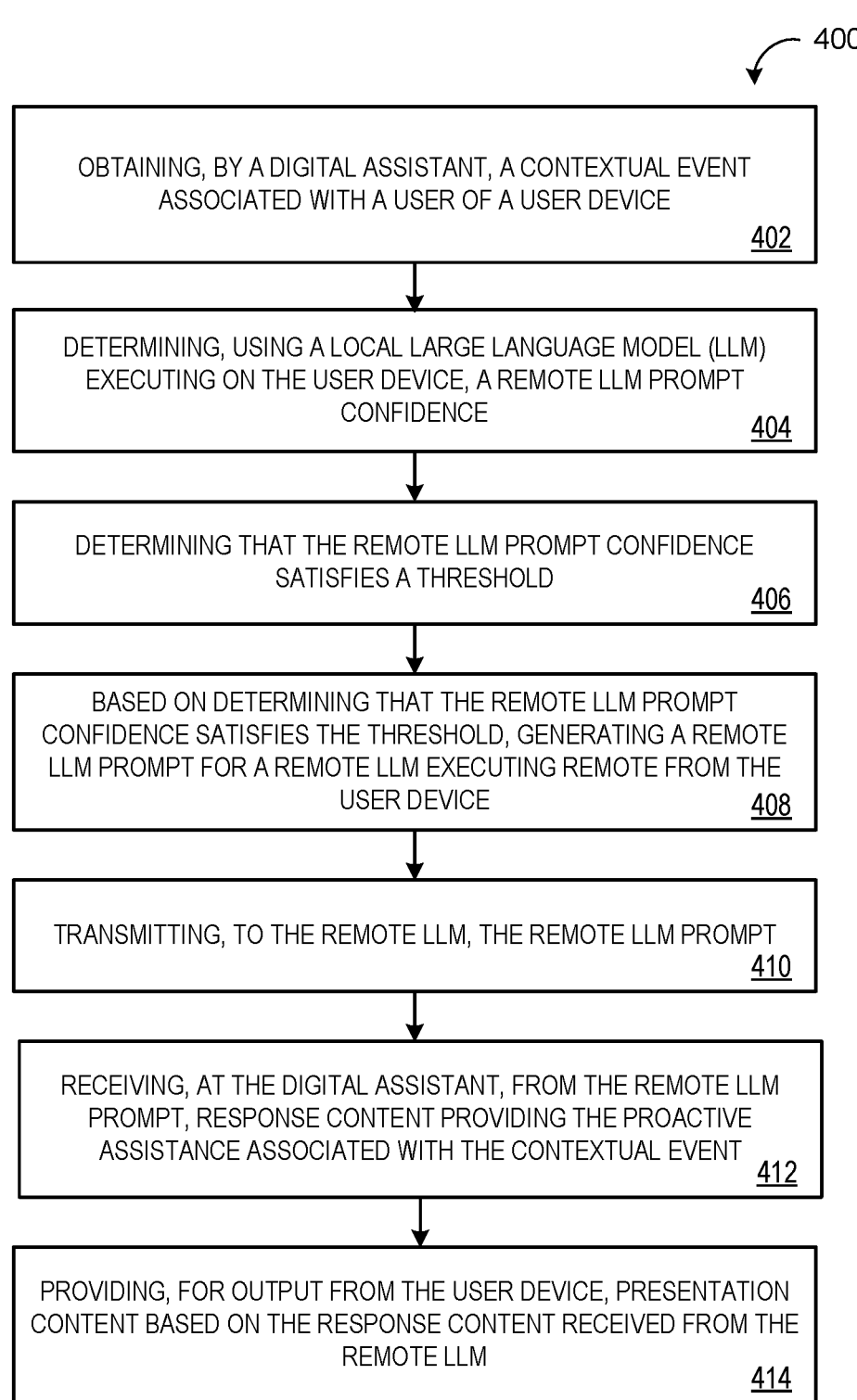
FIG. 4 is a flowchart of an example arrangement of operations for a method of providing proactive assistance to a user.

FIG. 4 is a flowchart of an exemplary arrangement of operations for a method 400 of providing proactive assistance via a cascade of LLMs. The computer-implemented method 400, when executed by data processing hardware 510 (FIG. 5), causes the data processing hardware 510 to perform operations. The method 400, at operation 402, includes obtaining, by a digital assistant 150, a contextual event 202 associated with a user 10 of a user device 110. The method 400, at operation 404, includes determining, using a local LLM 152 executing on the user device 110, a remote LLM prompt confidence 154 indicating a likelihood of prompting a remote LLM 160 for proactive assistance associated with the contextual event 202. At operation 406, the method 400 includes determining that the remote LLM prompt confidence 154 satisfies a threshold. Based on determining that the remote LLM prompt confidence 154 satisfies the threshold, the method 400, at operation 408, includes generating a remote LLM prompt 156 for the remote LLM 160 executing remote from the user device 110. At operation 410, the method 400 includes transmitting, to the remote LLM 160, the remote LLM prompt 156. The method 400, at operation 412, includes receiving, at the digital assistant 150, from the remote LLM 160, response content 162 providing the proactive assistance associated with the contextual event 202. At operation 414, the method 400 includes providing, for output from the user device 110, presentation content 180 based on the response content 162 received from the remote LLM 160.

Figure 5:
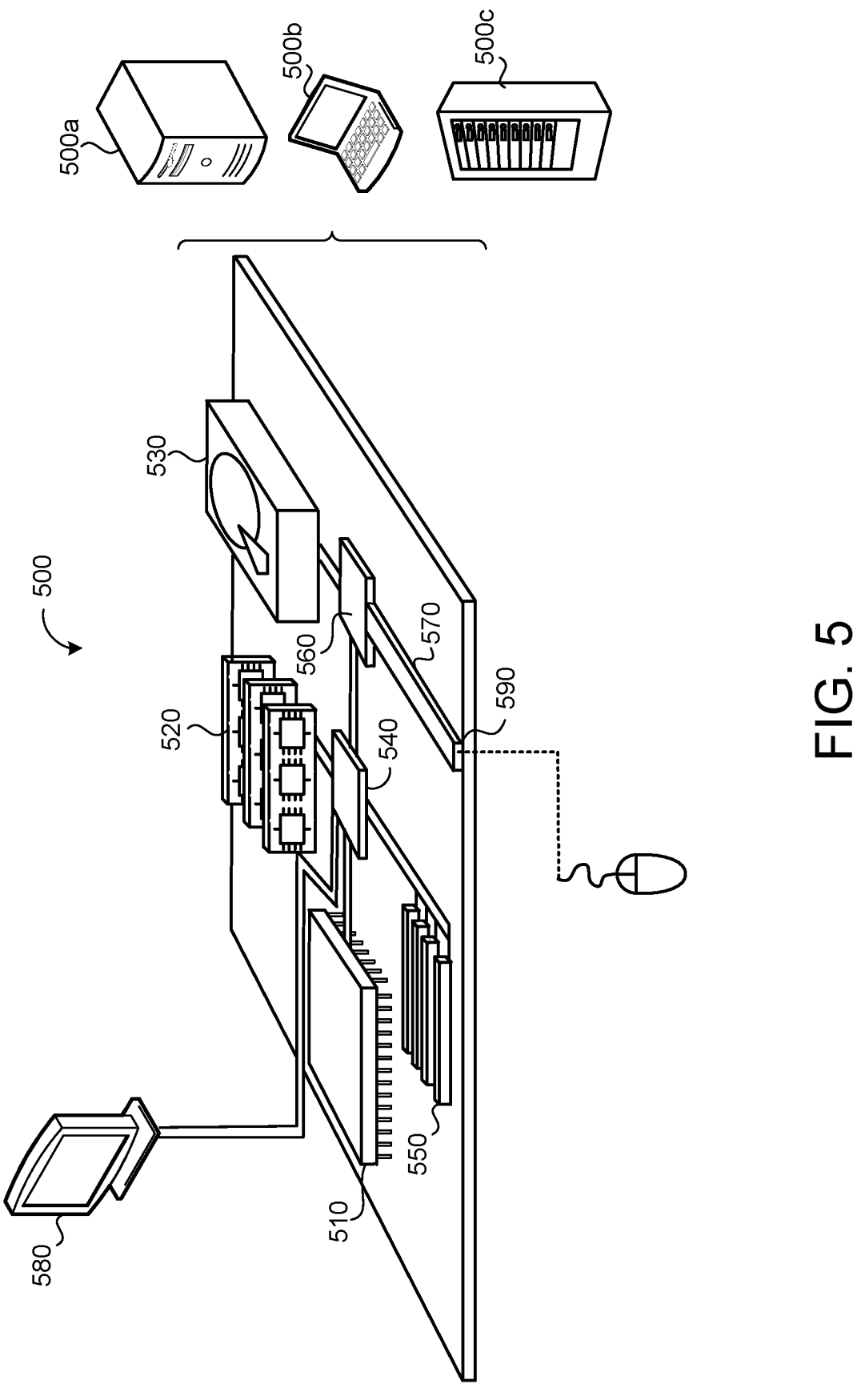
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:

obtaining, by a digital assistant, a contextual event associated with a user of a user device;

generating, using a local large language model (LLM) executing on the user device, initial response content associated with the contextual event, the initial response content providing an offer for the digital assistant to interact with a remote LLM to perform an action on the user's behalf based on the contextual event;

providing, for output from the user device, initial presentation content based on the initial response content, the initial presentation content prompting the user to consent to the offer for the digital assistant to interact with the remote LLM to perform the action on the user's behalf;

receiving an initial presentation content interaction indicating user interaction with the initial presentation content;

determining, using the local LLM, a remote LLM prompt confidence based on the received initial presentation content, the remote LLM prompt confidence indicating a likelihood of prompting a remote LLM for proactive assistance associated with the contextual event;

determining that the remote LLM prompt confidence satisfies a threshold;

based on determining that the remote LLM prompt confidence satisfies the threshold, generating a remote LLM prompt for the remote LLM executing remote from the user device;

transmitting, to the remote LLM, the remote LLM prompt;

receiving, at the digital assistant, from the remote LLM, response content providing the proactive assistance associated with the contextual event; and providing, for output from the user device, presentation content based on the response content received from the remote LLM.

2. The method of claim 1, wherein the remote LLM prompt confidence comprises a probability generated by the local LLM.

3. The method of claim 1, wherein
the remote LLM prompt confidence comprises the initial presentation content interaction.

4. The method of claim 1, wherein the initial presentation content interaction comprises user consent for transmitting the remote LLM prompt to the remote LLM.

5. The method of claim 1, wherein the remote LLM prompt is based on output from the local LLM.

6. The method of claim 5, wherein the output comprises a summary of the contextual event.

7. The method of claim 5, wherein:

the contextual event comprises personal identification information associated with the user; and generating the remote LLM prompt comprises redacting, using the output from the local LLM, the personal identification information.

8. The method of claim 1, wherein the contextual event comprises at least one of:

sensor data captured by a sensor of the user device; or application-specific data generated by another application executing on the user device.

9. The method of claim 1, wherein:

the contextual event comprises non-textual data; and the operations further comprise transforming the non-textual data into textual data.

10. The method of claim 1, wherein:

the operations further comprise batching a plurality of contextual events together; and determining the remote LLM prompt confidence is further based on the batched plurality of contextual events.

11. A system comprising:

data processing hardware; and memory hardware in communication with the data processing hardware, the memory hardware storing instructions that when executed on the data processing hardware cause the data processing hardware to perform operations comprising:

obtaining, by a digital assistant, a contextual event associated with a user of a user device;

generating, using a local large language model (LLM) executing on the user device, initial response content associated with the contextual event, the initial response content providing an offer for the digital assistant to interact with a remote LLM to perform an action on the user's behalf based on the contextual event;

providing, for output from the user device, initial presentation content based on the initial response content, the initial presentation content prompting the user to consent to the offer for the digital assistant to interact with the remote LLM to perform the action on the user's behalf;

receiving an initial presentation content interaction indicating user interaction with the initial presentation content;

determining, using the local LLM, a remote LLM prompt confidence based on the received initial presentation content, the remote LLM prompt confidence indicating a likelihood of prompting a remote LLM for proactive assistance associated with the contextual event;

determining that the remote LLM prompt confidence satisfies a threshold;

based on determining that the remote LLM prompt confidence satisfies the threshold, generating a remote LLM prompt for the remote LLM executing remote from the user device;

transmitting, to the remote LLM, the remote LLM prompt;

receiving, at the digital assistant, from the remote LLM, response content providing the proactive assistance associated with the contextual event; and providing, for output from the user device, presentation content based on the response content received from the remote LLM.

12. The system of claim 11, wherein the remote LLM prompt confidence comprises a probability generated by the local LLM.

13. The system of claim 11, wherein the remote LLM prompt confidence comprises the initial presentation content interaction.

14. The system of claim 11, wherein the initial presentation content interaction comprises user consent for transmitting the remote LLM prompt to the remote LLM.

15. The system of claim 11, wherein the remote LLM prompt is based on output from the local LLM.

16. The system of claim 15, wherein the output comprises a summary of the contextual event.

17. The system of claim 15, wherein:

the contextual event comprises personal identification information associated with the user; and generating the remote LLM prompt comprises redacting, using the output from the local LLM, the personal identification information.

18. The system of claim 11, wherein the contextual event comprises at least one of:

sensor data captured by a sensor of the user device; or application-specific data generated by another application executing on the user device.

19. The system of claim 11, wherein:

the contextual event comprises non-textual data; and the operations further comprise transforming the non-textual data into textual data.

20. The system of claim 11, wherein:

the operations further comprise batching a plurality of contextual events together; and determining the remote LLM prompt confidence is further based on the batched plurality of contextual events.

\* \* \* \* \*